United States Patent [19]

Katamine et al.

[11] Patent Number: 5,313,897
[45] Date of Patent: May 24, 1994

[54] SEWING OPERATION ROBOT

[75] Inventors: Kuniaki Katamine; Kaoru Kimura, both of Kitakyushu, Japan

[73] Assignee: Kabushiki Kaisha Yaskawa Denki, Fukuoka, Japan

[21] Appl. No.: 938,173
[22] PCT Filed: Jan. 8, 1992
[86] PCT No.: PCT/JP92/00004
  § 371 Date: Aug. 24, 1992
  § 102(e) Date: Aug. 24, 1992
[87] PCT Pub. No.: WO92/12283
  PCT Pub. Date: Jul. 23, 1992

[30] Foreign Application Priority Data
  Jan. 11, 1991 [JP] Japan ..................... 3-13956

[51] Int. Cl.$^5$ ............................. D05B 21/00
[52] U.S. Cl. ........................ 112/121.14; 901/15
[58] Field of Search ............. 112/121.14, 2, 104, 112/121.12, 121.15; 901/15, 20, 41, 48

[56] References Cited
U.S. PATENT DOCUMENTS 4,957,054 9/1990 Sakuma et al. ........... 112/121.14 X
5,065,684 11/1991 Hansberry ............... 112/121.12 X

FOREIGN PATENT DOCUMENTS 59-91991 10/1983 Japan.
61-32627 9/1986 Japan.
63-29690 2/1988 Japan.

*Primary Examiner*—Peter Nerbun
*Attorney, Agent, or Firm*—Jordan and Hamburg

[57] ABSTRACT

In a sewing operation robot (1), a simple harmonic motion device (2) is mounted on a wrist portion (12) thereof, and a sewing machine (5) is fixed on a sliding portion (3) of the simple harmonic motion device (2) to position the sewing machine (5) arbitrarily in a three-dimensional space and to operate the sewing machine (5) in an inching mode. A counter weight having the same weight as that of the sewing machine (5) is provided on the simple harmonic motion device (2) to prevent vibrations from occurring. Since the sewing machine is operated in the inching mode without inching the entire sewing operation robot, even a robot of low rigidity can perform sewing operations without causing friction between the sewing machine and the cloth and, further, a compact lightweight sewing operation robot can be provided.

3 Claims, 2 Drawing Sheets

SEWING OPERATION ROBOT

FIELD OF THE INVENTION

The present invention relates to a machine for automating sewing operations.

BACKGROUND OF THE INVENTION

Sewing operations have evolved from a method wherein a sewing machine is fixed and a sheet of cloth is moved on a flat surface so that it is continuously brought into contact with a reciprocating needle, and there has been developed a sewing machine for industrial use which is moved on a sheet of cloth fixed on a flat surface. However, this type of sewing machine has failed to sufficiently perform a variety of sewing operations required for clothes having puffs and the like. In order to solve this, a sewing operation robot has been developed wherein a sheet of cloth is temporarily fixed on a model simulating a human body: a sewing machine is mounted on an industrial robot capable of arbitrarily positioning in a three-dimensional space and causing the needle thereof to assume arbitrary attitudes: and sewing is carried out by moving the sewing machine freely around the model and the like.

Sewing operations include an inching operation wherein seam pitches are repeatedly operated and stopped at very short intervals (during which the needle is moved up and down). However, conventional general-purpose robots have been subjected to vibrations due to insufficient rigidity and have been unusable in some cases.

There is another problem in that sliding friction occurs between the needle and cloth resulting in breakage of the needle due to the increase in the temperature of the needle.

There is still another problem in that the configurations of the mechanical components are enlarged in order to improve the mechanical rigidity of the robot, for which the weight of the robot and the capacity of the motor driving it must be thus increased and, as a result, the configuration is enlarged and the weight of the entire robot is increased.

DISCLOSURE OF THE INVENTION

The present invention is a sewing operation robot wherein a sewing machine for performing sewing operations is fixed on a wrist portion, arbitrarily positioned in a three-dimensional space, and freely attitude-controlled, characterized in that a simple harmonic motion device for putting said sewing machine in a simple harmonic motion is provided between the wrist portion and sewing machine of said sewing operation robot.

Said sewing operation robot is operated at a velocity $V_R = P/T$ when the circular frequency $\omega$ of said simple harmonic motion device coincides with the circular frequency of the vertical motion of a needle provided on said sewing machine; the seam pitch of said sewing machine is represented by P; the half amplitude A of said simple harmonic motion device equals $P/2\pi$; and the cycle of the simple harmonic motion of said simple harmonic motion device is represented by T.

Further, said simple harmonic motion device is equipped with a counter weight whose weight is equal to that of said sewing machine, and which makes a simple harmonic motion in the direction opposite to the direction in which said sewing machine vibrates.

The sewing operation robot is operated at the constant velocity $V_R(=P/T)$. In the direction in which the robot moves, the simple harmonic motion device having the half amplitude A ($=P/2\pi$) and the circular frequency coinciding with the vertical motion of the needle is provided between the sewing machine and the sewing robot. Thus, the needle portion makes an inching operation.

When the sewing machine makes an inching operation, the counter weight balances with vibrational energy, preventing vibration from occurring.

The present invention provides the following advantages.

(1) Instead of using a robot having extremely high rigidity, a simple harmonic motion device having a simple structure added to an existing robot allows an inching operation which does not cause sliding friction between the sewing machine and the cloth. This results in a reduction in both cost and failure.

(2) Since the inching operation is performed only by the sewing machine along with a part of the simple harmonic motion device rather than the entire robot, and is balanced by the counter weight, the power required for the simple harmonic motion device can be reduced and, therefore, the running cost is reduced.

(3) Since the amplitude A of the simple harmonic motion device is $\frac{1}{2}\pi$ (about 1/6) times the pitch P, a small motor can be selected for driving said device. This allows the simple harmonic motion device to be compact and increases the effect as described in said (2) further.

DESCRIPTION OF THE PREFERRED EMBODIMENT

The present invention will now be described with reference to the embodiment illustrated.

Figure 1:
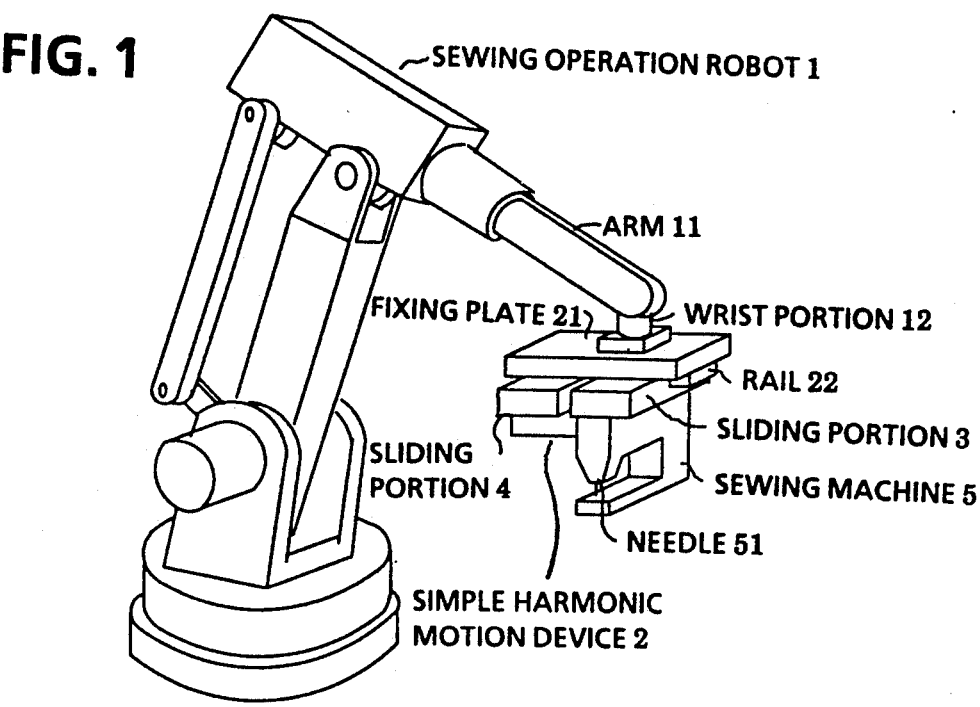
FIG. 1 is a perspective view showing an embodiment of the present invention.

FIG. 1 is a perspective view showing an embodiment of the present invention. A wrist portion 12 is provided on the end of an arm 11 of an articulated sewing operation robot capable of positioning arbitrarily in a three-dimensional space and of free attitude-controlling, and a fixing plate 21 of a simple harmonic motion device 2 is fixed on the end of the wrist portion 12. Sliding portions 3 and 4 capable of reciprocating in opposite directions in a simple harmonic motion are slidably provided on a rail 22 provided on the fixing plate 21, and a sewing machine 5 is fixed on the sliding portion 3. A needle 51 is provided on the sewing machine 5.

Figure 2:
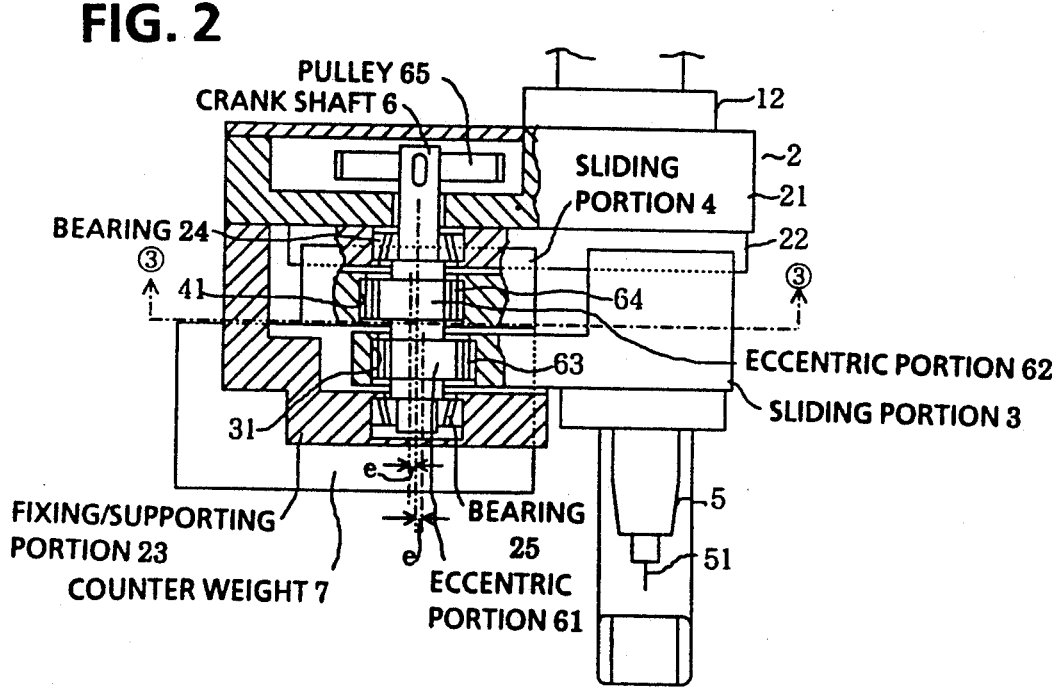
FIG. 2 is a sectional side view of an embodiment of the present invention.
Figure 3:
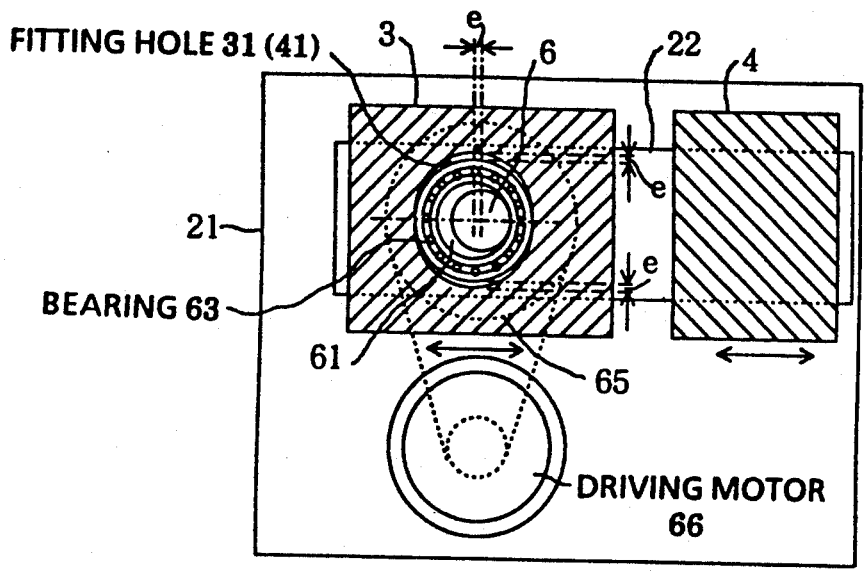
FIG. 3 is a sectional plan view taken along the line 3-3 in FIG. 2.

FIG. 2 is a sectional side view of the simple harmonic motion device 2, and FIG. 3 is a sectional plan view taken along the line 3—3 in FIG. 2. The rail 22 and a fixing/supporting portion 23 are provided on the fixing plate 21. A crank shaft 6 is supported by the rail 22 and fixing/supporting portion 23 through bearings 24 and 25. Eccentric portions 61 and 62 which are eccentric in opposite directions with respect to each other, are provided between the bearings 24 and 25 of the crank shaft 6.

Bearings 63 and 64 are fitted into the eccentric portions 61 and 62. The sliding portions 3 and 4 slidably provided on the rail 22 have elliptic fitting holes 31 and 41 whose length in the direction perpendicular to the direction of the slide is twice the quantity of the eccentricity e of the eccentric portions 61 and 62. The bearings 63 and 64 are slidably fitted into the holes 31 and 41, respectively.

When the crank shaft 6 is rotated by a driving motor 66 through a pulley 65 fixed on the crank shaft 6, the sliding portions 3 and 4 are moved by the eccentric portions 61 and 62 through the bearings 63 and 64 in opposite directions along the longitudinal direction of the rail 22. Since the elliptic fitting holes 31 and 41 are longer by 2e in the direction perpendicular to the rail 22, the movement of the eccentric portions 61 and 62 in the direction perpendicular to the rail 22 is canceled as a result of their movement to both ends of the fitting holes 31 and 41. Thus, there is no movement in the direction perpendicular to the rail 22.

The sewing machine 5 having the needle portion 51 is fixed on the sliding portion 3 while a counter weight 7 having the same weight as that of the sewing machine 5 is fixed on the sliding portion 4.

Therefore, the simple harmonic motion energy of the sewing machine 5 in the simple harmonic motion device 2 is canceled by the counter weight 7, and vibration is thus avoided.

A description will now be made on the relationship between the sewing operation robot 1 and the sewing machine 5 provided on the simple harmonic motion device 2 in terms of the distance and velocity of their movements.

The distance of the movement of the needle portion 51 provided on the sewing machine 5 is given by the following expression (1):

$$X_M = V_R t + A\sin\omega t \qquad (1)$$

where $V_R$ represents the velocity of the movement of the sewing operation robot 1: A represents the half amplitude of the simple harmonic motion device 2; and $\omega$ represents the circular frequency of the simple harmonic motion device 2 which coincides with the circular frequency of the vertical movement of the needle.

The distance of the seams $X_{Mn}$ up to the n-th pitch is expressed as follows.

$$X_{Mn} = V_R T_n + A\sin\omega t_n$$

The distance of the seams $X_{Mn+1}$ up to the (n+1)th pitch is expressed as follows.

$$X_{Mn+1} = V_R T_{n+1} + A\sin\omega t_{n+1}$$

Therefore, one pitch interval P of the seams is expressed as follows.

$$P = X_{Mn+1} - X_{Mn} = V_R(t_{n+1} - t_n) + A(\sin\omega t_{n+1} - \sin\omega t_n)$$

If the length of one pitch (one cycle) is constant:

$$\sin\omega t_{n+1} = \sin\omega t_n$$

If one pitch is represented by T $(= t_{n+1} - t_n)$, $P = VT$, and therefore:

$$V_R = P/T \qquad (2)$$

The cycle T of one vibration is expressed as follows.

$$T = 1/F = 2\pi/\omega_{+11} \text{ (f represents frequency)} \qquad (3)$$

Thus, the velocity of the movement $V_R$ of the sewing operation robot is determined by the circular frequency of the vertical movement of the needle and the seam pitch P.

On the other hand, the velocity of the movement $V_M$ of the needle is obtained as the following expression (4) from the expression (1).

$$V_M = V_R + A\omega\cos\omega t \qquad (4)$$

When the needle moves up and down relative to the cloth, the sewing machine and the cloth must be in a stopped state relative to each other, i.e., the velocity of the movement of the needle portion 51 must be 0 relative to the sheet of cloth and must not be a negative velocity. Therefore, according to the expression (4):

$$V_R = A\omega, \text{ and } A = V_R/\omega = V_R T/2\pi = P/2\pi \qquad (5)$$

Thus, once the seam pitch P is determined, the half amplitude A of the simple harmonic motion device 2 is determined.

If the initial condition for sewing is that t=0 and $V_M=0$, the velocity $V_M$ of the needle portion 51 is obtained as the following expression (6) from the expressions (2) and (3).

$$V_M = P/T - (P/T)\cos(2\pi/T)t \qquad (6)$$

Also, the distance of the movement $X_M$ of the needle portion 51 is as follows.

$$X_M = Pt/T - (P/2\pi)\sin(2\pi/T)t \qquad (7)$$

Figure 4:
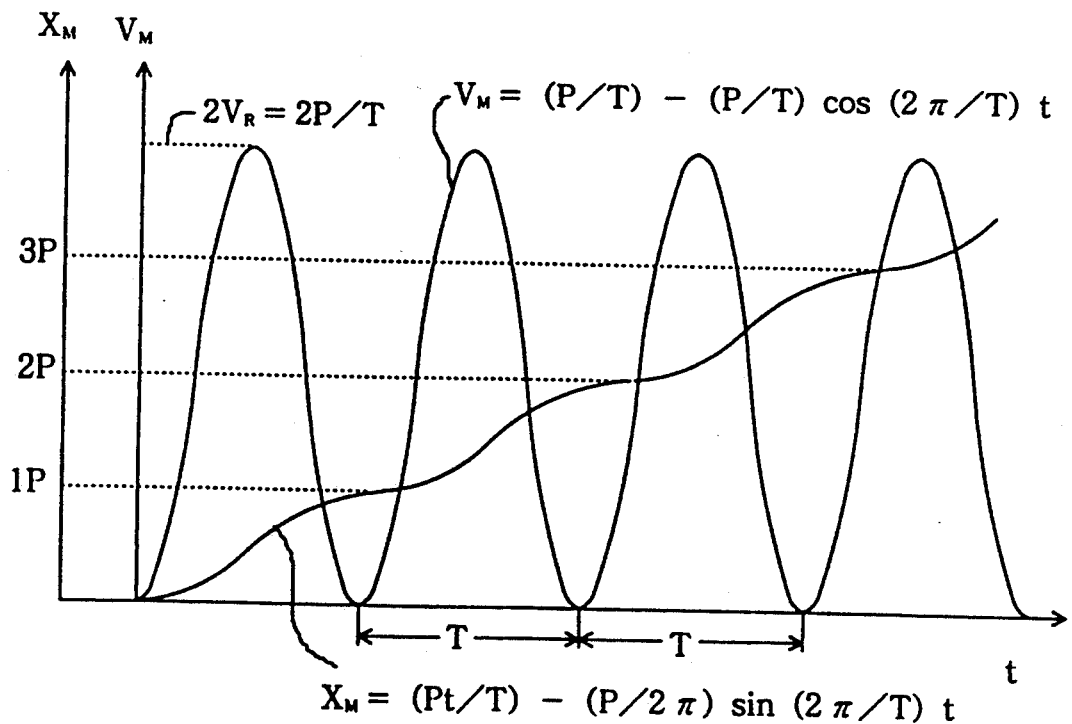
FIG. 4 is a time chart showing the changes over time in the velocity and travel distance of a needle portion.

FIG. 4 shows the changes over time of the velocity $V_M$ and the distance $X_M$ of the movement of the needle portion 51.

As described above, the sewing operation robot 1 is operated at a constant velocity $V_R$ (=P/T), and in the direction in which the robot moves, the simple harmonic motion device having the half amplitude A (=P/2$\pi$) and the circular frequency coinciding with the vertical motion of the needle, is provided between the sewing machine and the sewing robot 1. As a result, the needle portion makes an inching operation on a sheet of cloth at the velocity and distance given by the expressions (6) and (7).

We claim:

1. A sewing operation robot wherein a sewing machine for performing sewing operations is fixed on a wrist portion of said robot, said robot including means for controlling the position and attitude of said wrist portion, and comprising a simple harmonic motion device for putting said sewing machine in a simple harmonic motion, said simple harmonic motion device being provided between said wrist portion and said sewing machine.

2. A sewing operation robot according to claim 1 having an operating velocity $V_r = P/T$ when the circular frequency of said simple harmonic motion device coincides with the circular frequency $\omega$ of the vertical motion of a needle provided on said sewing machine; wherein the seam pitch of said sewing machine is P; the half amplitude A of said simple harmonic motion device is $P/2\pi$; and the cycle of the simple harmonic motion of said simple harmonic motion device is T.

3. A sewing operation robot according to claim 1 or claim 2 wherein said simple harmonic motion device comprises a counter weight and means for controlling said counter weight to make a simple harmonic motion in a direction opposite to the direction in which said sewing machine vibrates, said counter weight having a weight equal to that of said sewing machine.

* * * * *